US005900965A

United States Patent [19]

Matkin et al.

[11] Patent Number: 5,900,965

[45] Date of Patent: May 4, 1999

[54] WIDEBAND QUASI-OPTICAL MILLIMETER-WAVE RESONATOR

[75] Inventors: Brenda L. Matkin, Lacey's Spring; Ralph H. Halladay; Susan D. Terrill, both of Huntsville, all of Ala.

[73] Assignee: The United States of America as represented by the Secretary of the Army, Washington, D.C.

[21] Appl. No.: 09/072,998

[22] Filed: May 6, 1998

[51] Int. Cl.[6] .................................. G02F 1/09; G01B 9/02

[52] U.S. Cl. .......................... 359/283; 359/252; 359/589; 385/16; 385/37; 356/352; 356/445

[58] Field of Search .................................... 359/589, 251, 359/252, 283, 573; 385/4, 8, 10, 15, 37, 27, 16; 356/352, 445

[56] References Cited

U.S. PATENT DOCUMENTS

| | | | |
|---|---|---|---|
| 5,039,201 | 8/1991 | Liu | 359/589 |
| 5,379,110 | 1/1995 | Matsui et al. | 356/445 |
| 5,555,089 | 9/1996 | Dunn et al. | 356/352 |
| 5,565,987 | 10/1996 | Jain et al. | 356/352 |
| 5,652,817 | 7/1997 | Brinkman et al. | 385/37 |
| 5,703,710 | 12/1997 | Brinkman et al. | 359/283 |
| 5,781,670 | 7/1998 | Deacon et al. | 385/10 |

*Primary Examiner*—Loha Ben
*Attorney, Agent, or Firm*—Arthur H. Tischer; Hay Kyung Chang

[57] ABSTRACT

A wideband quasi-optical millimeter-wave resonator achieves a wideband frequency operation by using a variable dielectric constant photoconducting lens in a Fabry-Perot resonator. Changing the dielectric constant of the lens creates an associated change in the resonant frequency for a given axial mode.

9 Claims, 1 Drawing Sheet

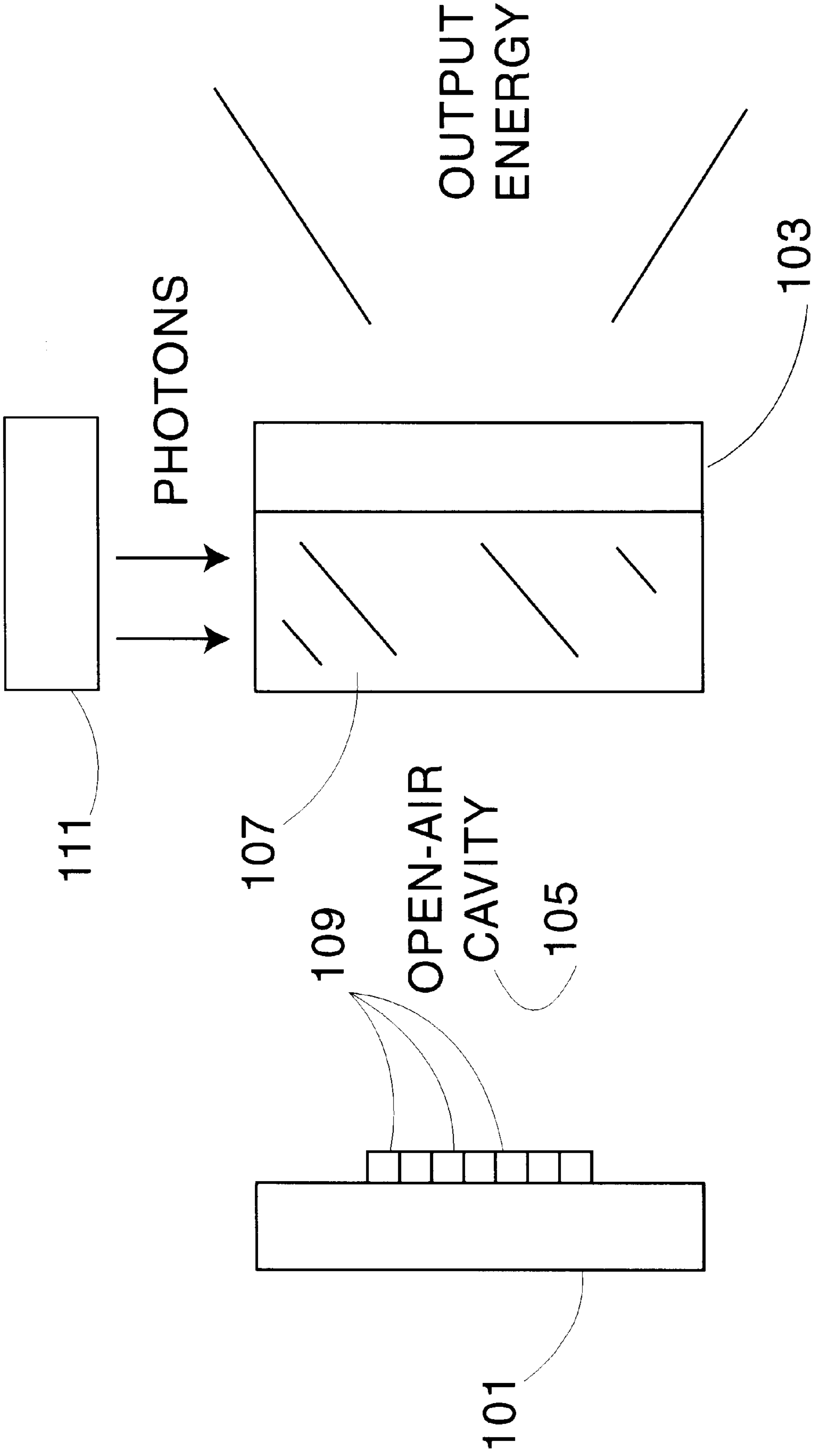
OUTPUT
ENERGY
PHOTONS
103
111
107
OPEN-AIR
CAVITY
105
109
101

WIDEBAND QUASI-OPTICAL MILLIMETER-WAVE RESONATOR

DEDICATORY CLAUSE

The invention described herein may be manufactured, used and licensed by or for the Government for governmental purposes without the payment to us of any royalties thereon.

BACKGROUND OF THE INVENTION

Quasi-optics describes the application of optical techniques to microwave and millimeter wave frequencies. The term "quasi-optical propagation" is generally defined as propagation of electromagnetic energy in free space by a beam of radiation that is a relatively small number of wavelengths in the transverse dimensions. The conditions for such propagation, which becomes increasingly effective at millimeter wavelengths, can be established by either internally or externally exciting a resonator that consists of two reflecting mirrors. For a quasi-optical resonator of length L, resonance occurs at all frequencies which yield a wavelength, inside the resonator cavity, that satisfies $$m\frac{\lambda}{2} = L$$

where m is any positive integer (axial number), $\lambda$ is the wavelength of the electromagnetic energy inside the resonator and L is the distance between the two reflecting mirrors. Thus, there are discrete spectral lines in the resonator, each having a fairly high quality factor (Q) and, consequently, low bandwidth.

SUMMARY OF THE INVENTION

A wideband quasi-optical millimeter-wave resonator is electronically tunable (as opposed to requiring mechanical manipulation of the distance between the mirrors) to render the resonator capable of achieving resonance at various frequencies of the millimeter-wave energy. This is done by inserting into the resonator cavity a photoconducting lens that has a variable dielectric constant and illuminating the lens with a laser beam of sufficient intensity to change the dielectric constant of the lens. Changing the dielectric constant of the lens changes the wavelength inside the lens material which ultimately alters the resonance frequency of the resonator.

DESCRIPTION OF THE DRAWING

The single FIGURE is a diagram of the wideband quasi-optical millimeter-wave resonator.

DESCRIPTION OF THE PREFERRED EMBODIMENT

A principal application of quasi-optics is in the area of millimeter-wave radars and seekers which offer the potential for all weather operation for tactical weapon systems in both land combat and air defense roles. Realization of this potential, however, requires high power, waveform controllable millimeter-wave sources. Quasi-optical power combining offers techniques for achieving high power with solid-state sources in small packages but the capability to achieve waveform control has been wanting. Since frequency control is an essential element of waveform control, it follows that a wideband quasi-optical millimeter-wave resonator as described herein provides such a waveform control.

As stated above, a principal application of quasi-optics is in the area of millimeter-wave radars and seekers. But such an application of quasi-optics to millimeter-wave radar generally places significant bandwidth requirements on the transmitter and receiver components of the radar so that an adequate minimum range resolution can be realized, as described by $$R_{min} = \frac{C}{2XBW}$$

where C is the speed of light and BW is the signal processing bandwidth. For example, to achieve 1 foot resolution, roughly 500 MHz of signal processing bandwidth is necessary. This processing bandwidth may be instantaneous, as in the case of very short pulse modulation, or it may be realized by stepping a narrow-band signal over a broad tunable bandwidth and then using an inverse Fourier transform to obtain range information. So, for quasi-optics to be useful in millimeter-wave radar, some means of extending the narrow bandwidth of the quasi-optic must be available.

Referring now to the drawing wherein like numbers represent like parts in the FIGURE, the single FIGURE illustrates the structure and operation of the wideband quasi-optical millimeter-wave resonator.

Into a quasi-optical resonator comprising a reflecting mirror 101 and a partially-reflecting mirror 103 that together form an open-air cavity 105 between them, a photoconducting lens 107 is inserted, suitably mounted to be in the path of the input millimeter-wave energy that travels in the resonator repeatedly between the mirrors 101 and 103. The photoconducting lens should be of sufficient thickness to transmit millimeter wave energy therethrough in the dark while attenuating the energy under illumination. A resonance frequency occurs when, in the cavity between the mirrors, there is a positive integer number (m) of half wavelengths of the input millimeter-wave energy. Therefore, varying the wavelength in the photoconducting lens requires a different cavity wavelength to maintain the same integer of half-wavelengths. Since $$f\lambda = c,$$

where f, $\lambda$, and c denote frequency, wavelength and the speed of light, respectively, any change in the cavity wavelength brings about a corresponding change in the resonance frequency.

To achieve such a change in the resonance frequency, the photoconducting lens 107 is excited with a beam of radiation from a suitable source such as a laser 111. The beam of radiation is of sufficient intensity to change the dielectric constant of the photoconducting material. Based on the relationship $$\lambda = \frac{\lambda_0}{\sqrt{\varepsilon_r}}$$

where $\lambda_0$ denotes free space wavelength and $\epsilon_r$ denotes the dielectric constant of the photoconducting material, a change in the dielectric constant of the material causes the wavelength of the input energy, while passing through the material, to change. The millimeter-wave input energy travels repeatedly between the mirrors, passing through the photoconducting lens during each trip and creating a focus spot of a certain size on each mirror.

The general condition for resonance within the dielectrically loaded cavity, then, is $$m\frac{\lambda}{2} = \int^{L} n(X)dx$$

where n(X) denotes the index of refraction of the photoconducting lens material which, in turn, is often equal to the square root of the dielectric constant of the material. So, changing the dielectric constant causes an associated change in the resonator frequency for a given axial mode, m.

The input millimeter-wave energy may be provided by optical power combining which can be accomplished by an array 109 of millimeter wave devices located within the resonator cavity. When voltage is supplied, the array produces millimeter wave energy that travels repeatedly through the photoconducting lens between the mirrors. The lens and the array should be as large as the focus spots that appear on the mirrors.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A quasi-optical resonator capable of operating over a wide frequency bandwidth, said quasi-optical resonator comprising:

a reflecting mirror; a partially-reflecting mirror, said mirrors together forming an open-air resonator cavity therebetween; a source of millimeter wave input energy, said energy being input to said resonator cavity to travel repeatedly between said mirrors, focusing on a spot on each mirror each time the energy is incident on that mirror, some of said energy being transmitted out of said resonator cavity as output via said partially-reflecting mirror, said mirrors maintaining therebetween a distance equal to a positive integer number of half wavelengths of said millimeter wave input energy; a photoconducting lens, said lens having a variable dielectric constant and being positioned within said cavity so as to be in the path of said travelling millimeter wave energy and a means for varying the dielectric constant of said lens, thereby ultimately causing a change in the frequency of resonance inside said cavity.

2. A quasi-optical resonator capable of operating over a wide frequency bandwidth as set forth in claim 1, wherein said varying means is a laser positioned such that a beam emanating therefrom impinges on said photoconducting lens, the intensity of said beam being sufficient to cause an alteration in the dielectric constant of said lens.

3. A quasi-optical resonator as set forth in claim 2, wherein said source of millimeter wave input energy is an allay of millimeter wave-emitting diodes, said array being located within said cavity.

4. A quasi-optical resonator as set forth in claim 3, wherein said photoconducting lens comprises silicon.

5. A quasi-optical resonator as set forth in claim 4, wherein said lens is at least as wide as the focus spot appealing on each of said mirrors and is of a thickness to transmit millimeter wave energy in the dark while attenuating millimeter wave energy under illumination.

6. In a Fabry-Perot resonator, an improvement to achieve resonance over wide frequency bandwidth, said improvement comprising:

a source of millimeter wave energy, said energy to be input to said resonator and a means for varying the integer number of half wavelengths between mirrors of said resonator so as to change the resonance frequency of said resonator without altering the physical distance between the mirrors.

7. An improvement for Fabry-Perot resonator as set forth in claim 6, wherein said varying means is a photoconducting lens having a variable dielectric constant, said lens being placed inside said resonator and a laser for emitting beams of pre-selected intensifies, said beams being incident on said lens and changing the dielectric constant of said lens, thereby changing the resonance frequency of said resonator.

8. An improvement for Fabry-Perot resonator as set forth in claim 6, wherein said lens comprises silicon.

9. A method for widening the operating frequency bandwidth of a quasi-optical resonator, said method comprising the steps of:

placing a photoconducting lens inside the cavity of a Fabry-Perot resonator;

inputting a millimeter wave energy of a given half wavelength;

emitting a laser beam of a pre-selected intensity to be incident on the lens and changing the dielectric constant of the lens;

maintaining in the resonator a positive integer number of half wavelengths of the input millimeter wave energy;

transmitting some of the energy out of the resonator as output.

* * * * *